(12) United States Patent
Takata et al.

(10) Patent No.: US 10,216,863 B2
(45) Date of Patent: Feb. 26, 2019

(54) PROGRAM GENERATION METHOD, PROGRAM GENERATION APPARATUS, AND STORAGE MEDIUM

(71) Applicant: Panasonic Intellectual Property Management Co., Ltd., Osaka (JP)

(72) Inventors: Kazutoyo Takata, Fukui (JP); Koji Morikawa, Tokyo (JP)

(73) Assignee: Panasonic Intellectual Property Management Co. Ltd., Osaka (JP)

( * ) Notice: Subject to any disclaimer, the term of this patent is extended or adjusted under 35 U.S.C. 154(b) by 0 days.

(21) Appl. No.: 15/722,070

(22) Filed: Oct. 2, 2017

(65) Prior Publication Data

US 2018/0107762 A1 Apr. 19, 2018

Related U.S. Application Data

(60) Provisional application No. 62/409,018, filed on Oct. 17, 2016.

(30) Foreign Application Priority Data

Apr. 14, 2017 (JP) ................. 2017-080780

(51) Int. Cl.
*G06F 17/30* (2006.01)
*G06T 13/00* (2011.01)

(52) U.S. Cl.
CPC .. *G06F 17/30979* (2013.01); *G06F 17/30256* (2013.01); *G06F 17/30867* (2013.01); *G06T 13/00* (2013.01); *G06F 17/3097* (2013.01); *G06F 17/30265* (2013.01)

(58) Field of Classification Search
CPC ......... G06F 17/30979; G06F 17/30256; G06F 17/30867; G06F 17/30265; G06F 17/3097; G06T 13/00
See application file for complete search history.

(56) References Cited

U.S. PATENT DOCUMENTS

2010/0281036 A1 11/2010 Inoue et al.

FOREIGN PATENT DOCUMENTS

| JP | 9-330425 | 12/1997 |
|---|---|---|
| JP | 2007-141105 | 6/2007 |
| JP | 2008-046847 | 2/2008 |
| JP | 2011-119869 | 6/2011 |
| JP | 2013-257692 | 12/2013 |

*Primary Examiner* — Christopher Wait
(74) *Attorney, Agent, or Firm* — Wenderoth, Lind & Ponack, L.L.P.

(57) ABSTRACT

An input image being displayed is acquired. A database is accessed to search for an image similar to the input image from images stored in the database. A candidate script associated with the similar image is retrieved from the database, and a decisive degree of the candidate script is calculated based on a result of the search for the similar image. A presentation program is generated by changing a value of a parameter included in the candidate script depending on the decisive degree. The input image is changed by executing the generated presentation program.

11 Claims, 17 Drawing Sheets

FIG. 3

| MOVEMENT | MOVEMENT | CHANGE x-COORDINATE BY [p1] AT A TIME |
|---|---|---|
| | MOVEMENT/MOVEMENT | SET x-COORDINATE TO [p3] AND y-COORDINATE TO [p4] IN [p2] SEC |
| | ROTATION | ROTATE COUNTERCLOCKWISE BY [p5] DEGREES |
| APPEARANCE | DISPLAY PERIOD | DISPLAY TEXT FOR [p6] SEC |
| | DENSITY | CHANGE COLOR (BRIGHTNESS) BY [p7] AT A TIME |
| | SIZE | CHANGE SIZE BY [p8] AT A TIME |
| | TRANSPARENCY | CHANGE TRANSPARENCY BY [p9] AT A TIME |
| SOUND | RHYTHM | BEAT DRUM [p10] TIMES |
| | SOUND VOLUME | CHANGE SOUND VOLUME BY [p11] AT A TIME |
| | TEMPO | CHANGE TEMPO BY [p12] AT A TIME |
| CHARACTER | COLOR | CHANGE CHARACTER COLOR BY [p13] AT A TIME |
| | THICKNESS | CHANGE CHARACTER THICKNESS BY [p14] AT A TIME |
| | DENSITY | CHANGE CHARACTER DENSITY BY [p15] AT A TIME |
| CONTROL | TIMER | WAIT FOR [p16] SEC |
| | NUMBER OF ITERATIONS | REPEAT [p17] TIMES |

FIG. 5

| USER ID | PROJECT ID | IMAGE ID | SCRIPT ID |
|---------|------------|----------|-----------|
| x | P1 | I_x_P1_1 | Script_x_P1_1 |
|   |    | I_x_P1_2 | Script_x_P1_2 |
|   |    | I_x_P1_3 | Script_x_P1_3 |
|   | P2 | I_x_P2_1 | Script_x_P2_1 |
|   |    | I_x_P2_2 | Script_x_P2_2 |
| y | P1 | I_y_P1_1 | Script_y_P1_2 |
|   | P2 | I_y_P2_1 | Script_y_P2_1 |
|   |    | I_y_P2_2 | Script_y_P2_2 |
| ... | ... | ... | ... |

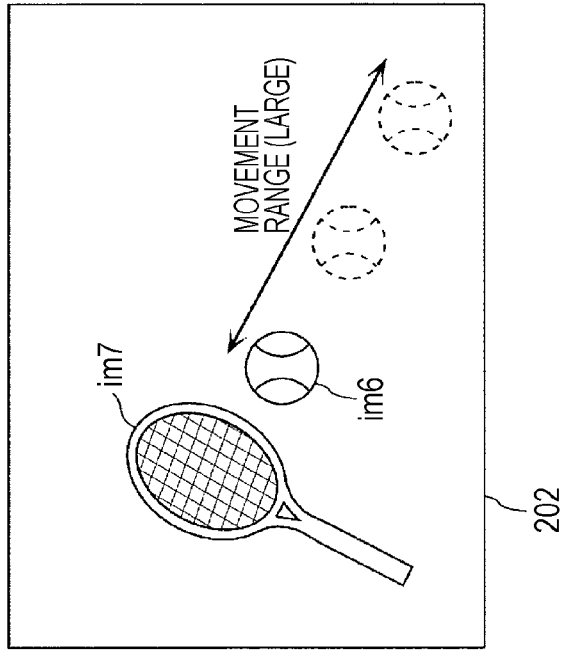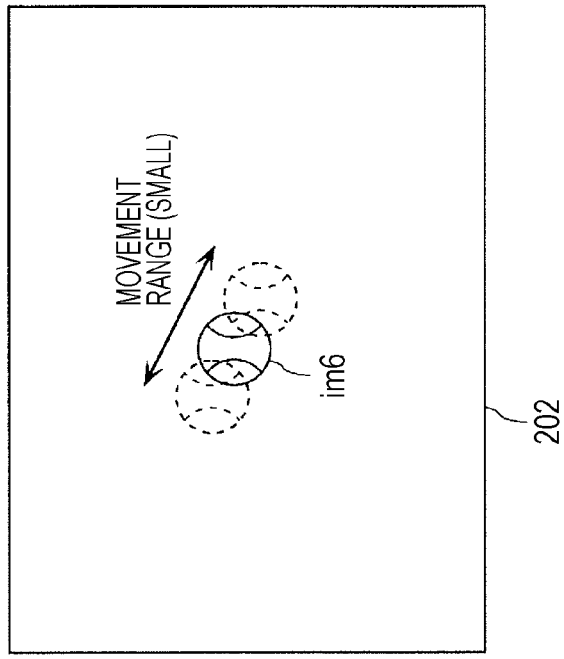

PROGRAM GENERATION METHOD, PROGRAM GENERATION APPARATUS, AND STORAGE MEDIUM

BACKGROUND

1. Technical Field

The present disclosure relates to a method of generating a computer program for changing an image, and related techniques.

2. Description of the Related Art

Now, a visual programming language enabling a user to generate a program via a visual operation without describing a source code is available. Scratch developed by the MIT Media Lab is a visual programming language for use by a child (see, for example, "Scratch" at Internet URL: https://scratch.mit.edu/). Scratch allows a child or a beginner to generate a program without having to learn a rigid rule of writing syntax. For example, Scratch provides visual blocks as commands for generating a program. A user, who may be a child, draws an image and then selects and combines one or more visual blocks from among the provided visual blocks to be applied to the drawn image. Furthermore, the user is allowed to edit values of parameters of the selected visual blocks. As a result, a computer program (a script) for the drawn image is generated. When the resultant computer program is executed, the drawn image changes like an animation.

Such a method of generating a program using Scratch enables children to produce, for example, an enjoyable interactive animations. Such experience leads to enhancing their motivation to learn programming.

SUMMARY

The conventional program generation method described above, however, has a problem that generating a computer program requires a user a complicated task.

One non-limiting and exemplary embodiment provides a program generation method capable of allowing a user to easily generate a computer program for changing an image.

In one general aspect, the techniques disclosed here feature a program generation method including (a) acquiring an input image displayed on a display, (b) accessing a storage medium storing images and computer programs, the images each corresponding to the computer programs, each of the computer programs being for use in changing the corresponding image, (c) searching for one or more images, as one or more similar images, similar to the input image from the images stored in the storage medium, (d) selecting a computer program as a candidate program from the one or more computer programs corresponding the one or more similar images, the candidate program corresponding to a similar image included in the one or more similar images, (e) calculating a decisive degree on the candidate program for the input image, based on a result of the search for the one or more similar images, (f) generating a presentation program by changing a value of all or part of one or more parameters included in the candidate program in accordance with the decisive degree, the value of the one or more parameters indicating a degree to which the similar image is to be changed, and (g) changing the input image displayed on the display by executing the generated presentation program.

According to the present disclosure, it is possible for a user to easily generate a computer program for changing an image.

It should be noted that general or specific embodiments may be implemented as a system, a method, an integrated circuit, a computer program, a computer-readable storage medium, or any selective combination thereof. The computer-readable storage medium may be a non-transitory storage medium such as a CD-ROM (Compact Disc-Read Only Memory) or the like.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a diagram illustrating an example of a command list according to an embodiment;

FIG. 5 is a diagram illustrating a manner of associating each data stored in the database according to an embodiment;

FIG. 16A is a diagram illustrating an example of an input image that changes in accordance with a script generated by presented by a program generation apparatus according to a modification of an embodiment;

FIG. 16B is a diagram illustrating another example of an input image that changes in accordance with a script generated by presented by a program generation apparatus according to a modification of an embodiment.

DETAILED DESCRIPTION

Figure 1:
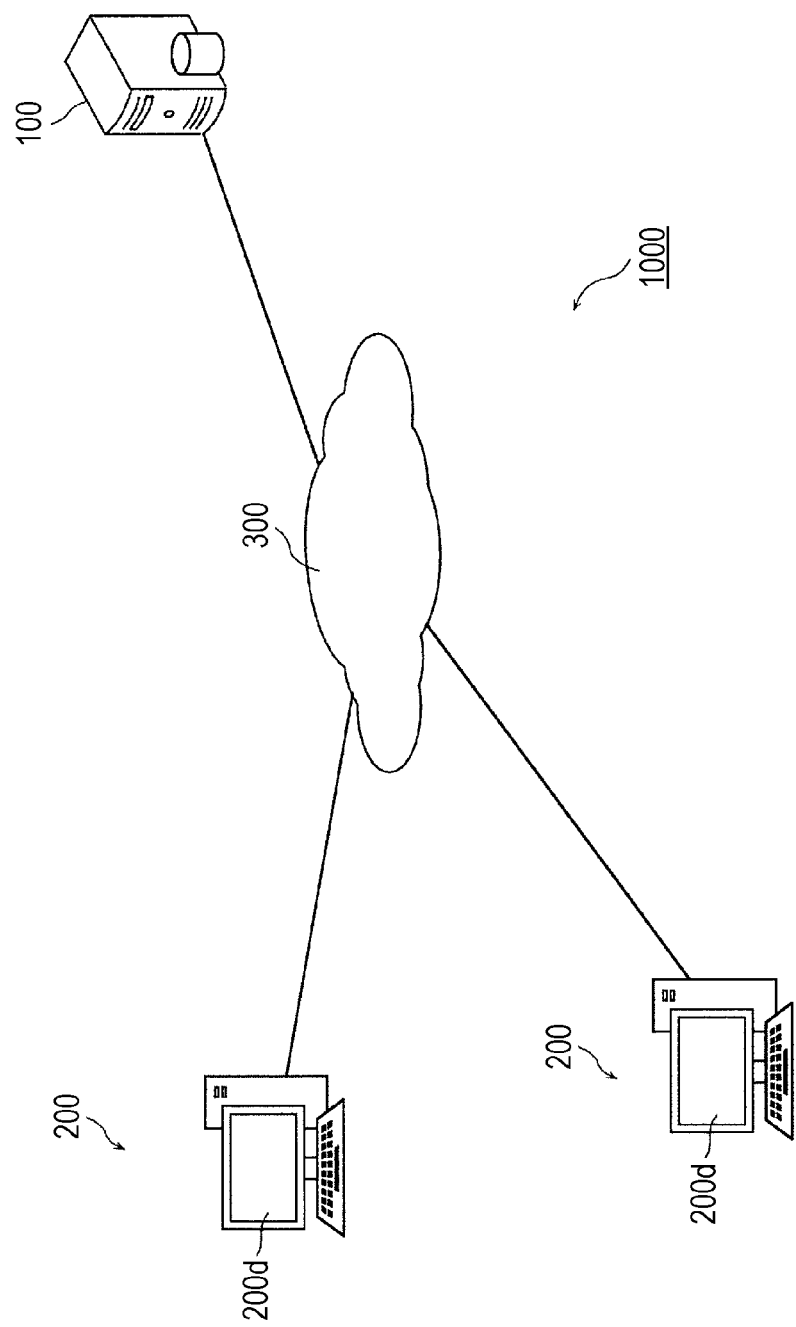
FIG. 1 is a diagram illustrating a configuration of a program generation system according to an embodiment.

Underlying Knowledge Forming Basis of the Present Disclosure

The present inventor has found that Scratch described in section "2. Description of the Related Art" has problems as described below.

As described above, Scratch provides a several kinds of commands as computer programs for changing an image. A user selects an image and/or draws an image using an input tool (for example, a mouse). The resultant image is displayed as an input image on a display. Next, the user selects one or more commands, to be applied to the input image, from the provided several kinds of commands. The user then sets a value of a parameter included in each of the selected one or more commands. The value of the parameter indicates a degree to which the image is to be changed. Thus, executing a script including the selected one or more commands changes the input image to the degree specified by the value of the parameter.

However, a user is bothered to select and combine commands to be applied to the input image from the provided several kinds of commands. Thus, automatic generation of a program (script) to be applied to the input image reduces such a bother greatly. One of the ideas to automatically generate the program (script) to be applied to the input image is to search for a program suitable for the input image from a database prepared in advance. For example, in a case where programs suitable for the input image are found in the database, one of the programs is selected and applied to the input image.

However, in this case, it may be difficult for a user to get to know a state of the searching for programs (scripts). That is, it may be difficult for a user to get to know, for example, whether there are many programs suitable for the input image in addition to the program selected for the input image or conversely there are only few programs suitable for the input image. In other words, it is difficult for the user to determine whether the selected program has been obtained as a final suitable program as a result of narrowing many pieces of program data or conversely narrowing is not sufficient.

To handle a situation such as that described above, in an aspect of the present disclosure, a program generation method includes (a) acquiring an input image displayed on a display, (b) accessing a storage medium storing images and computer programs, the images each corresponding to the computer programs, each of the computer programs being for use in changing the corresponding image, (c) searching for one or more images, as one or more similar images, similar to the input image from the images stored in the storage medium, (d) selecting a computer program as a candidate program from one or more computer programs corresponding the one or more similar images, the candidate program corresponding to a similar image included in the one or more similar images, (e) calculating a decisive degree on the candidate program for the input image, based on a result of the search for the one or more similar images, (f) generating a presentation program by changing a value of all or part of one or more parameters included in the candidate program in accordance with the decisive degree, the value of the one or more parameters indicating a degree to which the similar image is to be changed, and (g) changing the input image displayed on the display by executing the generated presentation program. Examples of parameters described above are a movement distance of a similar image corresponding to the candidate program, an amount of change in image size corresponding to the candidate program, an amount of change in color component of a similar image corresponding to the candidate program, and the like.

Thus one or more image similar to the input image are retrieved as similar images, and one computer program is selected as a candidate program from computer programs respectively associated with the one or more similar images. Thereafter, the value of the parameter of this candidate program is changed thereby generating a presentation program to be applied to the input image. Thus, the presentation program to be applied to the input image is automatically generated. Therefore, after a user draws an input image on a display, the user does not have to generate a computer program to be applied to the input image by combining some of commands prepared in advance. Thus, it is possible to easily generate a computer program for changing an input image.

In the program generation method according to an aspect of the present disclosure, the value of the parameter of the candidate program is changed depending on a decisive degree calculated based on a result of searching for the one or more similar images. In a storage medium, computer programs are respectively associated with images, and thus the searching for a similar image is equivalent to searching for a computer program suitable for the input image. The value of the parameter indicates a degree of a change in image. Therefore, when a presentation program including a parameter having a changed value is executed, the input image is changed to the degree specified by the value of the parameter, and thus a user can intuitively and easily understand the state of searching for computer programs from a degree to which the displayed image is changed. That is, it is possible to provide information to a user such that the user can easily understand whether the search for computer programs suitable for the input image from a large number of computer programs stored in the storage medium has been narrowed down sufficiently or not. In a case where the user realizes that the narrowing is not sufficient, the user may, for example, add a graphical image or the like to the input image or may make some other amendment. This time, the computer programs can be further narrowed, which makes it possible to generate a computer program, as a presentation program, more suitable for the input image. That is, it is possible to easily generate a computer program suitable for an input image.

In (d) described above, the computer program selected as the candidate program may be a computer program corresponding to an image most similar to the input image among the one or more similar images.

This makes it possible to properly select a candidate program that is a base of the presentation program.

The decisive degree may be such a value that the greater the number of the one or more similar images is, the smaller the value is, while the smaller the number of the one or more similar images is, the greater the value is. For example, in (e) described above, the decisive degree may be calculated by calculating the ratio of the number of the one or more similar images to the number of the images stored in the storage medium and subtracting the resultant ratio from 1. On the other hand, in (e) described above, the decisive degree may be a first value when the number of the one or more similar images is greater than or equal to the threshold value, and the decisive degree may be a second value greater than the first value when the number of the one or more similar images is smaller than the threshold value.

That is, when the narrowing of computer programs is insufficient, the decisive degree is small, but when the narrowing of computer programs is sufficient, the decisive degree is large. Therefore, for example, in a case where a value of a parameter is changed by multiplying the value of the parameter by the decisive degree, when the narrowing is insufficient, the value of the parameter is reduced, which results in a reduction in the degree to which the input image is changed. Conversely, when the narrowing is sufficient, the value of the parameter is increased, which results in an increase in the degree to which the input image is changed. This allows a user to more intuitively and easily understand the state of searching for computer programs.

In (g) described above, the input image changed by the presentation program may be returned to the original state, and the presentation program may be executed again such that the input image displayed on the display is changed repeatedly.

In a case where the input image is changed only once, when the degree of changing the image is small, there is a possibility that it is not easy for a user to notice that the presentation program has been generated and executed. However, in the program generation method according to the aspect of the disclosure, the input image is changed repeatedly such that a user can easily notice that a presentation program has been generated and executed even in a case where the degree of changing the input image is small. This allows the user to intuitively and easily understand the state of searching for computer programs.

The program generation method may further include (h) displaying the generated presentation program on the display.

Displaying the presentation program on the display makes it possible for a user to learn programming for changing an input image. Furthermore, a value of a parameter of the presentation program is also displayed, and thus a user is allowed to compare the value of the parameter and the degree to which the displayed input image is changed, and thus the user can determine, based on the comparison, whether it is necessary or not to amend the value of the parameter.

In another aspect, the present disclosure provides a program generation method including (a) acquiring an input image displayed on a display, (b) accessing a storage medium storing images and computer programs, the images each corresponding to the computer programs, each of the computer programs being for use in changing the corresponding image, (c) searching for one or more images, as one or more similar images, similar to the input image from the images stored in the storage medium, (d) generating a computer program, as a candidate program for changing the input image, based on computer programs, (e) calculating a decisive degree on the candidate program for the input image, based on a result of the search for the one or more similar images, and (f) changing the input image on the display according to the calculated decisive degree.

Also in this aspect, as with the previous aspects, it is possible to easily generate a computer program suitable for an input image.

Embodiments are described below with reference to drawings.

Note that any embodiment described below is provided to illustrate a general or specific example. In the following embodiments, values, shapes, materials, constituent elements, locations of elements, manners of connecting elements, steps, the order of steps, and the like are described by way of example but not limitation. Among constituent elements described in the following embodiments, those constituent elements that are not described in independent claims indicating highest-level concepts of the present disclosure are optional.

Note that drawings provide schematic views in which everything is not strictly shown. Similar constituent elements are denoted by similar symbols or numerals among different figures.

Embodiments

System

FIG. 1 illustrates a configuration of a program generation system according to an embodiment.

In the present embodiment, a program generation system 1000 includes, as is illustrated, for example, in FIG. 1, a program generation apparatus 100, terminal apparatuses 200, and a communication network 300.

Each of the terminal apparatuses 200 may include a personal computer, a smartphone a tablet terminal. Each of these terminal apparatuses 200 displays an input image on a display 200d of the terminal apparatus 200 in response to an operation performed by a user.

The communication network 300 may be, for example, a WAN (Wide Area Network), a LAN (Local Area Network), or the Internet. The communication network 300 connects the program generation apparatus 100 and each of the terminal apparatuses 200 such that the program generation apparatus 100 and each of the terminal apparatuses 200 with each other.

The program generation apparatus 100 communicates with the terminal apparatus 200 via the communication network 300, and generates a computer program for changing the input image displayed on the display 200d of the terminal apparatus 200. The program generation apparatus 100 according to the present embodiment generates a script as the computer program.

Figure 2:
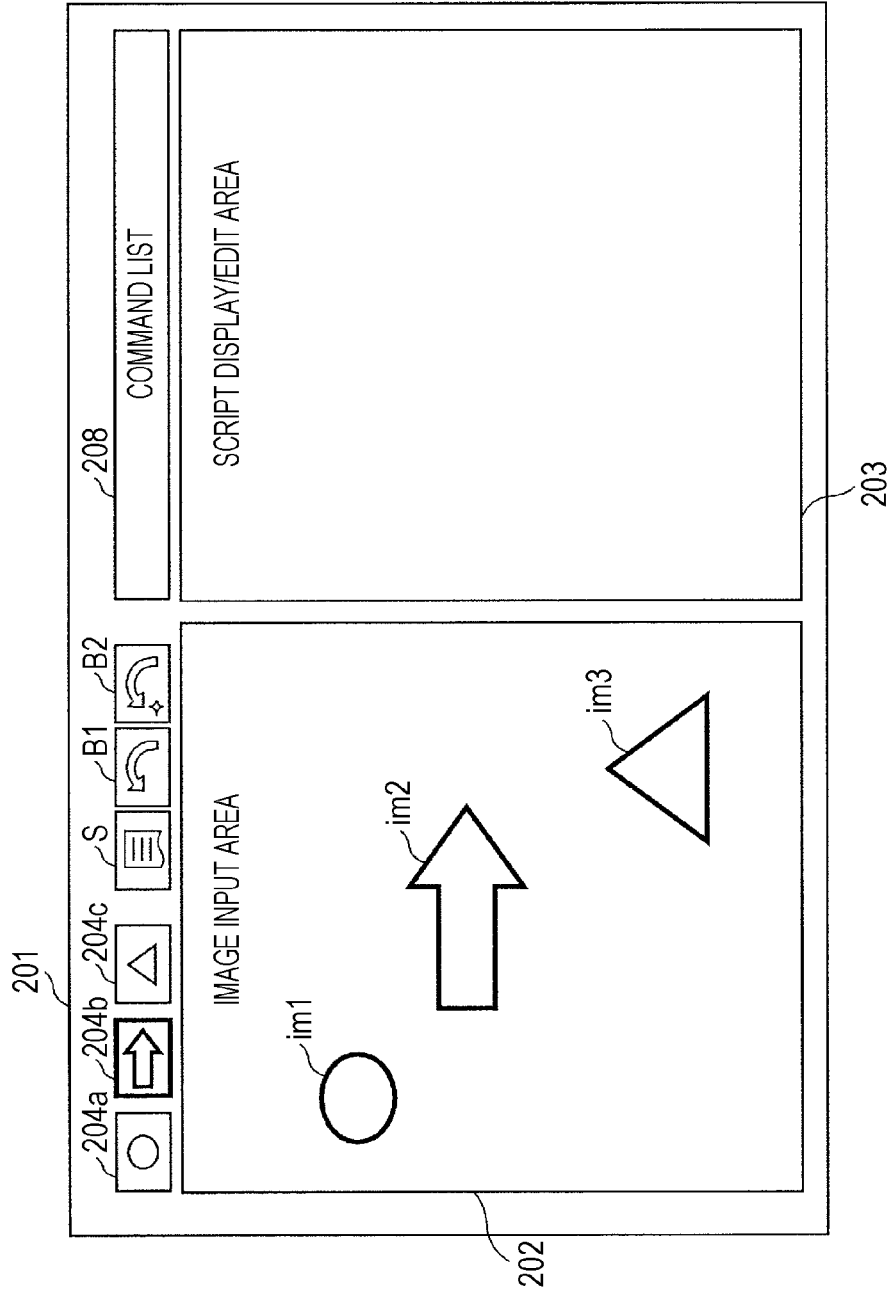
FIG. 2 is a diagram illustrating an example of a screen displayed on a display of a terminal apparatus according to an embodiment.

FIG. 2 illustrates an example of a screen displayed on the display 200d of the terminal apparatus 200.

The program generation apparatus 100 displays a script generation screen 201, for generating the script, on the display 200d of the terminal apparatus 200 via the communication network 300.

The script generation screen 201 includes an image input area 202, a script display/edit area 203, image selection buttons 204a to 204c, operation buttons S, B1, and B2, and a command list button 208.

In the image input area 202, input images im1 to im3 are displayed when they are drawn on the terminal apparatus 20 in response to an operation performed by a user. Hereinafter, an operation performed by a user on the terminal apparatus 200 will be referred to as an input operation.

The image selection buttons 204a to 204c are respectively used to select input images im1 to im3 displayed in the image input area 202. For example, when the image selection button 204a is selected in response to an input operation, the input image im1, which is one of the input images im1 to im3 displayed in the image input area 202, is selected as a target image to be processed. For example, when an input operation is performed, the program generation apparatus 100 performs a process corresponding to the input operation on the target image. More specifically, for example, the program generation apparatus 100 displays the script generated for the target image on the display 200d of the terminal apparatus 200, or amends or edits the target image or the script corresponding to the target image. In a case where a newly drawn image is given as an input image, the program generation apparatus 100 may select this input image as the target image even when selection using an image selection button is not performed.

In the script display/edit area 203, the script generated for the target image is displayed. A value of a parameter included in the script displayed in the script display/edit area 203 is changed or edited according to an input operation.

The operation button S is used to cause the script generated by the program generation apparatus 100 to be displayed in the script display/edit area 203. That is, when the operation button S is selected as a result of an input operation, the terminal apparatus 200 instructs, via the communication network 300, the program generation apparatus 100 to display the script. In response to receiving the instruction from the terminal apparatus 200, for example, the program generation apparatus 100 displays the script generated for the target image in the script display/edit area 203 of the script generation screen 201.

The operation button B1 is used to amend or edit the target image displayed in the image input area 202. That is, when the operation button B1 is selected as a result of an input operation, the terminal apparatus 200 instructs, via the communication network 300, the program generation apparatus 100 to amend the target image. In response to receiving the instruction from the terminal apparatus 200, the program generation apparatus 100 gets into a state in which the program generation apparatus 100 waits for information, from the terminal apparatus 200, related to an input operation to be performed to amend or edit the target image.

The operation button B2 is used to add a new input image to the image input area 202. That is, when the operation button B2 is selected as a result of an input operation, the terminal apparatus 200 instructs, via the communication network 300, the program generation apparatus 100 to add the new input image. In response to receiving the instruction to add the new input image from the terminal apparatus 200, the program generation apparatus 100 gets into a state in which the program generation apparatus 100 waits for a newly drawn image to be given as an input image via an input operation. The terminal apparatus 200 gets into a state in which the terminal apparatus 200 waits for the newly drawn image to be given as the input image via the input operation. A newly drawn input image in response to an input operation during the waiting is displayed in the image input area 202.

The command list button 208 is used to display a command list (also referred to as a script control function list) including two or more types of commands available on the program generation apparatus 100. That is, when the command list button 208 is selected as a result of an input operation, the terminal apparatus 200 instructs, via the communication network 300, the program generation apparatus 100 to display the command list. In response to receiving the instruction to display the command list from the terminal apparatus 200, the program generation apparatus 100 displays the command list on the display 200d of the terminal apparatus 200. The terminal apparatus 200 may select one or more commands to be applied to the input image from the command list according to an input operation.

FIG. 3 illustrates an example of a command list.

The command list may include, for example, commands associated with "motion", commands associated with "appearance", commands associated with "sound", commands associated with "character", and commands associated with "control".

Each command associated with "motion" is a computer program for moving an input image. Examples of commands associated with "motion" include a command to "change an x-coordinate by 'p1' at a time", a command to "rotate by 'p5' degrees in a counterclockwise direction". An example of a command associated with "control" is a command to "repeat 'p17' times". Each command includes "pn" (where n is an integer greater than or equal to 1) which is a value of a parameter indicating a degree to which an image or a sound is changed. In the present embodiment, the value of the parameter included in each command is determined in advance.

In the present embodiment, in a case where a command is selected from the command list shown in FIG. 3 as a result of an input operation, the program generation apparatus 100 may generate a new script to be applied to an input image by changing a value of a parameter included in the selected command.

Configuration of Apparatus

Figure 4:
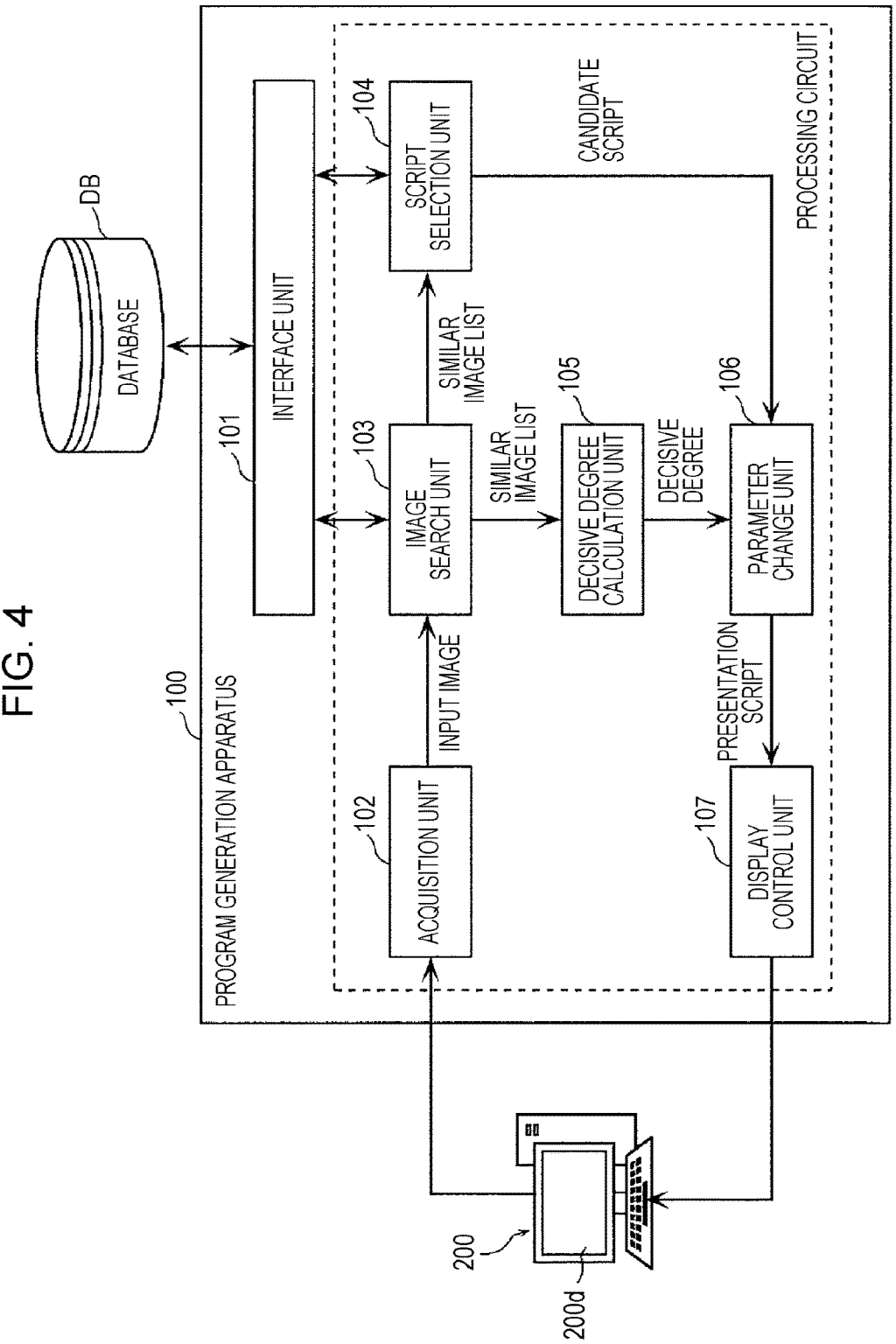
FIG. 4 is a block diagram illustrating a configuration of a program generation apparatus according to an embodiment.

FIG. 4 is a block diagram illustrating a configuration of the program generation apparatus 100 according to an embodiment.

The program generation apparatus 100 is an apparatus that generates a computer program in the form of a script for changing an image. The program generation apparatus 100 includes an interface unit 101, an acquisition unit 102, an image search unit 103, a script selection unit 104, a decisive degree calculation unit 105, a parameter change unit 106, and a display control unit 107. Of these constituent elements of the program generation apparatus 100, constituent elements other than the interface unit 101, that is, the acquisition unit 102, the image search unit 103, the script selection unit 104, the decisive degree calculation unit 105, the parameter change unit 106, and the display control unit 107 are disposed in a processing circuit.

The interface unit 101 has a function that allows the image search unit 103 and the script selection unit 104 of the program generation apparatus 100 to access a database DB. The interface unit 101 may be, for example, a USB (Universal Serial Bus) terminal, an HDMI (registered trademark) (High-Definition Multimedia Interface) terminal, or a wireless communication unit. The database DB is a storage medium in which images and scripts are stored such that the images and the scripts are associated in a one-to-one correspondence. Each script included in the scripts is used to change a corresponding image included in the images. Each of the scripts stored in the database DB corresponds to one of, or a combination of two or more of, the commands included in the command list.

The acquisition unit 102 acquires, as an input image, an image drawn on the display 200d of the terminal apparatus 200. The acquisition unit 102 also acquires, from the terminal apparatus 200, an instruction corresponding to an input operation such as a selection of the operation button S.

The image search unit 103 accesses the database DB via the interface unit 101, and searches for one or more images, as one or more similar images, similar to the input image acquired by the acquisition unit 102 from the images stored in the database DB.

The script selection unit 104 accesses the database DB via the interface unit 101, and selects a script as a candidate script (that is, a candidate program) from one or more scripts, included in the database DB, corresponding to the one or more similar images. More specifically, the script selection unit 104 selects, as the candidate script, a script corresponding to an image most similar to the input image from the one or more similar images.

The decisive degree calculation unit 105 calculates a decisive degree of the candidate script for the input image based on the search result in terms of the one or more similar images retrieved by the image search unit 103.

The parameter change unit 106 acquires the candidate script from the script selection unit 104 and acquires the decisive degree from the decisive degree calculation unit 105. The parameter change unit 106 then generates a presentation script (that is, a presentation program) by changing the value of the parameter or the values of the parameters, which are included in the candidate script and each of which indicates the degree to which the image is changed, depending on the decisive degree. Examples of the parameters are a movement distance of the image, an amount of change in an image size of the image, and an amount of change in a color component of the image. FIG. 3 illustrates specific examples of commands. In these examples, the parameter p1 included in the command to "change x-coordinate by 'p1' at a time" is the movement distance of the image, the parameter p8 included in the command to "change size by 'p8' at a time" is the amount of change in the image size, and the parameter p7 included in the command to "change color (brightness) by 'p7' at a time" is the amount of change in the color component of the image.

The display control unit 107 changes the input image displayed on the display 200*d* of the terminal apparatus 200 by executing the generated presentation script. The display control unit 107 also displays the generated presentation script on the display 200*d* of the terminal apparatus 200.

Database

FIG. 5 illustrates examples of data associated with each other and stored in the database DB according to the present embodiment.

As described above, the database DB stores the images and the scripts. The scripts each correspond to the images and each of the scripts are used to change the corresponding images. Each image stored in the database DB is assigned an image ID as an identifier for identifying the image. Furthermore, each script stored in the database DB is assigned a script ID as an identifier for identifying the script. For example, in the database DB, as is shown in FIG. 5, an image having an image ID "I_x_P1_1" is associated with a script having a script ID "Script_x_P1_1". An image having an image ID "I_x_P1_2" is associated with a script having a script ID "Script_x_P1_2".

In the present embodiment, a project is configured by a combination of one or more images and one or more scripts wherein the one or more images are respectively associated with the one or more scripts. Such a project is generated, for example, by a user of each terminal apparatus 200 and is stored in the database DB. That is, a project is configured so as to include all input images drawn in the image input area 202 by a user and scripts, each corresponding to the input images, generated by the user, and the resultant project is stored in the database DB. In the database DB, each project is assigned a project ID as an identifier for identifying the project. Furthermore, the user who generated the project is assigned a user ID as an identifier for identifying the user. In the database DB, image ID's are grouped for each project ID. Furthermore, project ID's are grouped for each user ID. That is, one or more images included in one project are associated with this project, and one or more projects generated by one user are associated with this user.

Figure 6:
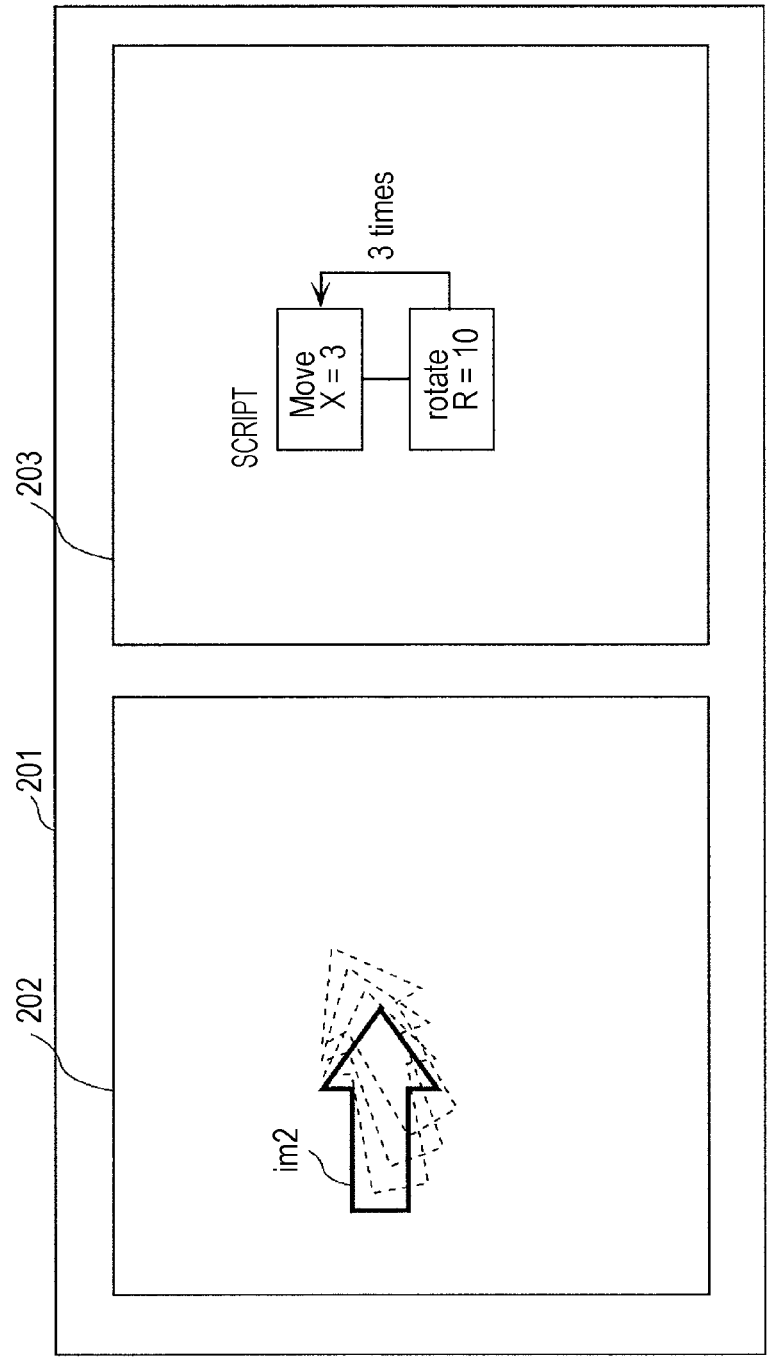
FIG. 6 is a diagram illustrating an example of a script generated by a program generation apparatus according to an embodiment.

FIG. 6 is a diagram illustrating an example of a script generated by the program generation apparatus 100. More specifically, FIG. 6 illustrates a script generation screen 201 including an image input area 202 and a script display/edit area 203, wherein the other elements are not shown.

For example, a user draws an image im2 of an arrow in the image input area 202 by performing an input operation. The acquisition unit 102 of the program generation apparatus 100 acquires this image im2 as an input image. The image search unit 103 searches for images similar to the input image im2, as similar images, from the database DB. In the present embodiment, the program generation apparatus 100 generates a presentation script depending on a result of the search for the similar images.

For example, in a case where a large number of similar images (for example, a several ten thousand similar images) are obtained in the search, there is a possibility that narrowing the similar images for the input image im2 is not sufficient.

In this case, the script selection unit 104 of the program generation apparatus 100 selects, as a candidate script, a script associated with an image most similar to the input image im2. For example, the candidate script includes a command to "change x-coordinate by [12] at a time", a command to "rotate counterclockwise by [40] degrees at a time", and a command to "repeat [12] times". Note that a numerical value described in each pair of square brackets is a value of a parameter indicating a degree to which an image is to be changed. The program generation apparatus 100 changes values of the parameters of the candidate script depending on the state of the narrowing as is shown in FIG. 6. For example, when the narrowing is insufficient, the parameter change unit 106 of the program generation apparatus 100 reduces the values of the parameters included in the candidate script. More specifically, for example, the parameter change unit 106 generates a new script as a presentation script such that the new script includes a command to "change x-coordinate by [3] at a time", a command to "rotate counterclockwise by [10] degrees at a time", and a command to "repeat [3] times". The display control unit 107 of the program generation apparatus 100 displays the generated presentation script in the script display/edit area 203 and executes this presentation script. As a result, the input image im2 displayed in the image input area 202 changes according to the presentation script.

When the user sees the changes of the input image im2, the user can easily understand, from a small degree of the movement of the input image im2, that the narrowing of the scripts retrieved for the input image im2 is not sufficient.

Figure 7:
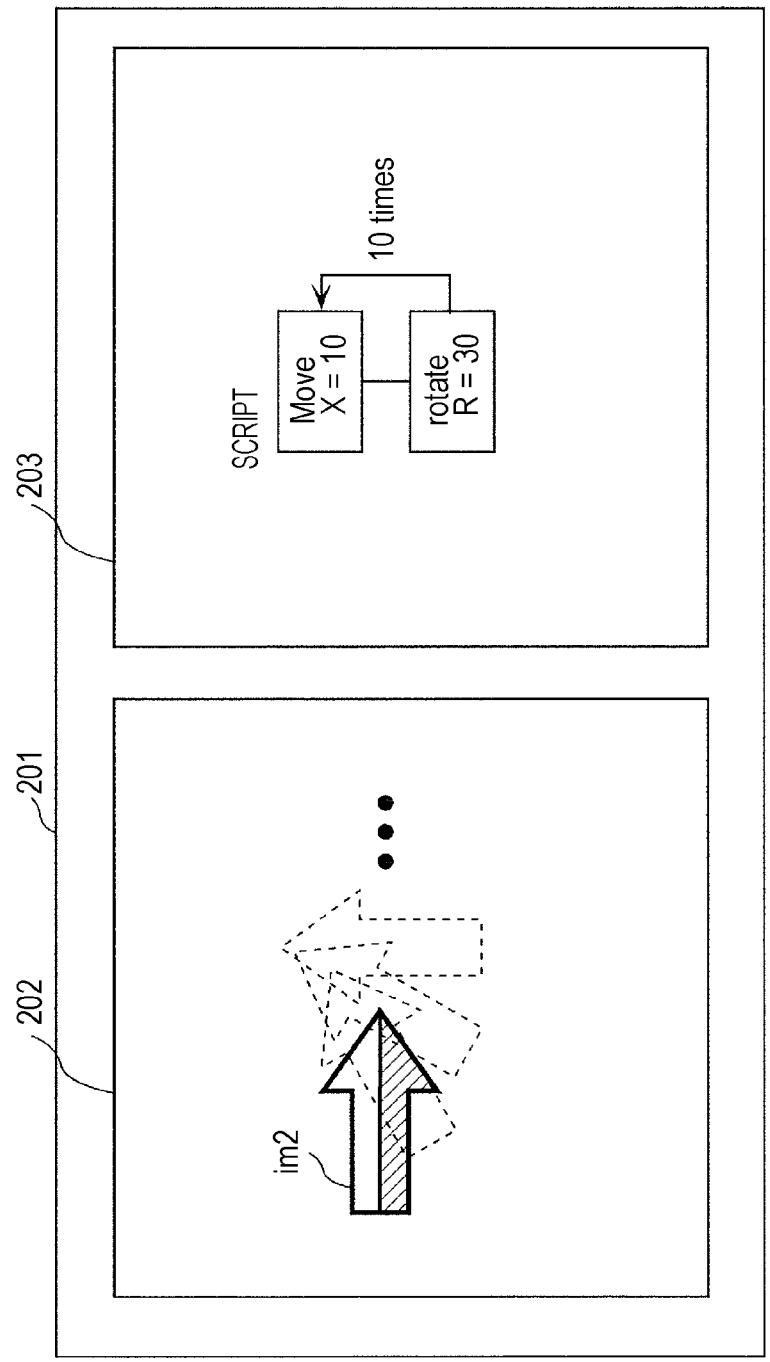
FIG. 7 is a diagram illustrating another example of a script generated by a program generation apparatus according to an embodiment.

FIG. 7 illustrates another example of a script generated by the program generation apparatus 100. Note that FIG. 7, as with FIG. 6, illustrates a script generation screen 201 including an image input area 202 and a script display/edit area 203, wherein the other elements are not shown.

When a user gets to know that the narrowing of scripts is not sufficient, the user may try to obtain a script more suitable for the input image im2. Thus, for example, the user may select the operation button B1 shown in FIG. 2 to amend the input image im2 of the arrow shown in image input area 202 as is shown in FIG. 6 to generate an amended image as is shown in FIG. 7. The acquisition unit 102 of the program generation apparatus 100 acquires the amended input image im2. The image search unit 103 searches for images, as similar images, which are similar to the amended input image im2, from the database DB. In this state, for example, a small number of similar images are found (for example, 20 similar images are found), and thus the narrowing of similar images for the input image im2 is now sufficient.

Also in this case, as described above, the script selection unit 104 of the program generation apparatus 100 selects, as a candidate script, a script associated with an image that is most similar to the amended input image im2. For example, the candidate script includes a command to "change x-coordinate by [12] at a time", a command to "rotate counterclockwise by [40] degrees at a time", and a command to "repeat [12] times". Thereafter, as is shown in FIG. 7, the program generation apparatus 100 changes values of the parameters of the candidate script depending on the state of the narrowing as is shown in FIG. 7.

In this case, unlike the example shown in FIG. 6, the narrowing is sufficient, and thus the parameter change unit 106 of the program generation apparatus 100 determines the parameter reduction ratio such that the determined parameter reduction ratio is smaller than the parameter reduction ratio shown in the example shown in FIG. 6. More specifically, for example, the parameter change unit 106 generates a new script as a presentation script such that the new script includes a command to "change x-coordinate by [10] at a time", a command to "rotate counterclockwise by [30] degrees at a time", and a command to "repeat [10] times". The display control unit 107 of the program generation apparatus 100 displays the generated presentation script in the script display/edit area 203 and executes this presentation script. As a result, the amended input image im2 displayed in the image input area 202 has large changes according to the presentation script.

The occurrence of the large change in the input image im2 shown in FIG. 7 allows the user to easily recognize that sufficient narrowing of the similar images, that is, the narrowing of the scripts is achieved. Thus, the user can easily know that a script more suitable for the input image im2 has been generated.

In the program generation apparatus 100 according to the present embodiment, as described above, the smaller the number of retrieved similar images is, the greater the value of the parameter or the values of the parameters of the presentation script are. Thus, it is possible to present information such that a user can intuitively recognize the state of the narrowing of similar images, that is, the state of the narrowing of candidate scripts.

Overall Operation

Figure 8:
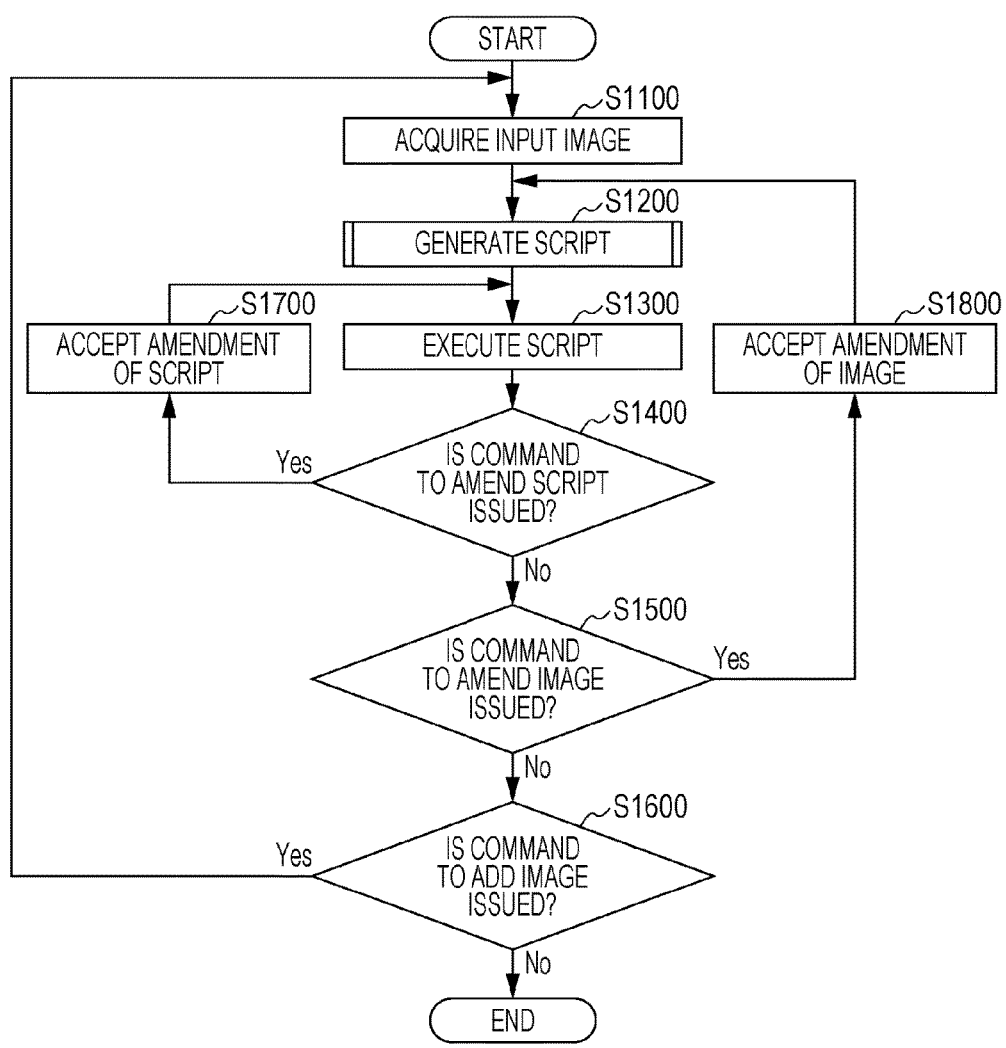
FIG. 8 is a flow chart illustrating an example of an overall processing operation of a program generation apparatus according to an embodiment.

FIG. 8 is a flow chart illustrating an example of an overall processing operation of the program generation apparatus 100.

Step S1100. First, the program generation apparatus 100 acquires an input image from the terminal apparatus 200.

Step S1200. Next, when a predetermined period (hereinafter referred to as a decision period) has been elapsed since the acquisition of the input image, the program generation apparatus 100 starts generating a script corresponding to the acquired input image. Note that this acquired image is the above-described presentation script, and the decision period is a period in which a decision is performed as to whether the generation of the script is to be started. That is, the program generation apparatus 100 does not start the generation of the presentation script immediately after the input image is acquired, but the program generation apparatus 100 waits for a decision period in which the program generation apparatus 100 accepts amending of the input image in this decision period. If the program generation apparatus 100 accepts amending, that is, if the program generation apparatus 100 acquires an amended input image, the program generation apparatus 100 again waits for a decision period. When the decision period has elapsed, the program generation apparatus 100 starts generating the presentation script as described above. Note that in a case where the program generation apparatus 100 accepts a command to generate the script from the terminal apparatus 200, the program generation apparatus 100 may start generating the script immediately after the command is accepted without waiting for the decision period to end.

Step S1300. Next, the program generation apparatus 100 executes the generated presentation script.

Step S1400. Next, the program generation apparatus 100 determines whether a command to amend the presentation script is issued by the terminal apparatus 200. In a case where it is determined that an amendment command has been issued (Yes in step S1400), the program generation apparatus 100 proceeds to a process in step S1700. On the other hand, in a case where it is determined that no amendment command has been issued (No in step S1400), the program generation apparatus 100 proceeds to a process in step S1500.

Step S1500. The program generation apparatus 100 determines whether the terminal apparatus 200 has issued a command to amend the input image acquired in step S1100. For example, in a case where the operation button B1 of the script generation screen 201 is selected, the program generation apparatus 100 determines that a command to amend the input image is issued. In a case where it is determined that an amendment command has been issued (Yes in step S1500), the program generation apparatus 100 proceeds to a process in step S1800. On the other hand, in a case where it is determined that no amendment command has been issued (No in step S1500), the program generation apparatus 100 proceeds to a process in step S1600.

Step S1600. The program generation apparatus 100 determines whether a command to add a new input image has been issued from the terminal apparatus 200. For example, in a case where the operation button B2 of the script generation screen 201 is selected, the program generation apparatus 100 determines that a command to add a new input image is issued. In a case where it is determined that an addition command has been issued (Yes in step S1600), the program generation apparatus 100 executes the process again from step S1100. On the other hand, in a case where it is determined that no addition command has been issued (No in step S1600), the program generation apparatus 100 ends all process associated with the script generation.

Step S1700. When it is determined in step S1400 that a command to amend the presentation script is issued, the program generation apparatus 100 amends the presentation script in accordance with the input operation performed by the user. Thereafter, the program generation apparatus 100 proceeds to a process in step S1300.

Step S1800. When it is determined in step S1500 that a command to amend the input image is issued, the program generation apparatus 100 amends the input image in accordance with the input operation performed by the user. Thereafter, the program generation apparatus 100 proceeds to a process in step S1200.

In the present embodiment, the program generation apparatus 100 executes the process from step S1100 to S1800 described above to generate a project including one or more images each capable of being changed according to a script.

Generating Script

Figure 9:
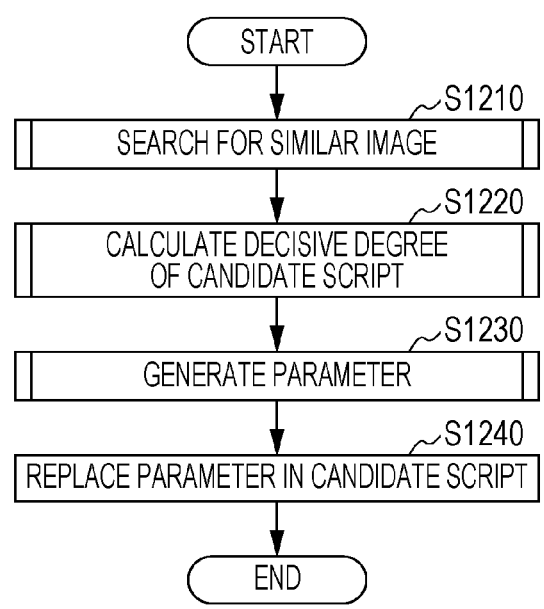
FIG. 9 is a flow chart illustrating an example of a detailed processing operation performed in a step in FIG. 8 to generate a script.

FIG. 9 is a flow chart illustrating an example of a detailed processing operation of generating a script performed in step S1200 in FIG. 8.

Step S1210. The image search unit 103 of the program generation apparatus 100 acquires an input image from the terminal apparatus 200 via the acquisition unit 102, and accesses the database DB via the interface unit 101. The image search unit 103 then searches for one or more images, as similar images, similar to the input image from images stored in the database DB.

Step S1220. Next, the decisive degree calculation unit 105 calculates a decisive degree of candidate scripts based on a result of the search, performed by the image search unit 103, for the one or more similar images. For example, the more the one or more similar images are retrieved, the smaller the decisive degree is, and the less the one or more similar images are retrieved, the greater the decisive degree is.

Step S1230. Next, the script selection unit 104 accesses the database DB via the interface unit 101, and the script selection unit 104 selects one script as a candidate script from scripts associated with the one or more respective similar images found in the database DB. The parameter change unit 106 extracts, from the candidate script, a parameter indicating the degree to which an image is to be changed, and changes a value of the parameter depending on the decisive degree calculated in step S1220.

Step S1240. Next, the parameter change unit 106 replaces the value of the parameter included in the candidate script by the value of the parameter changed in step S1230 thereby generating a presentation script.

Image Search

Figure 10:
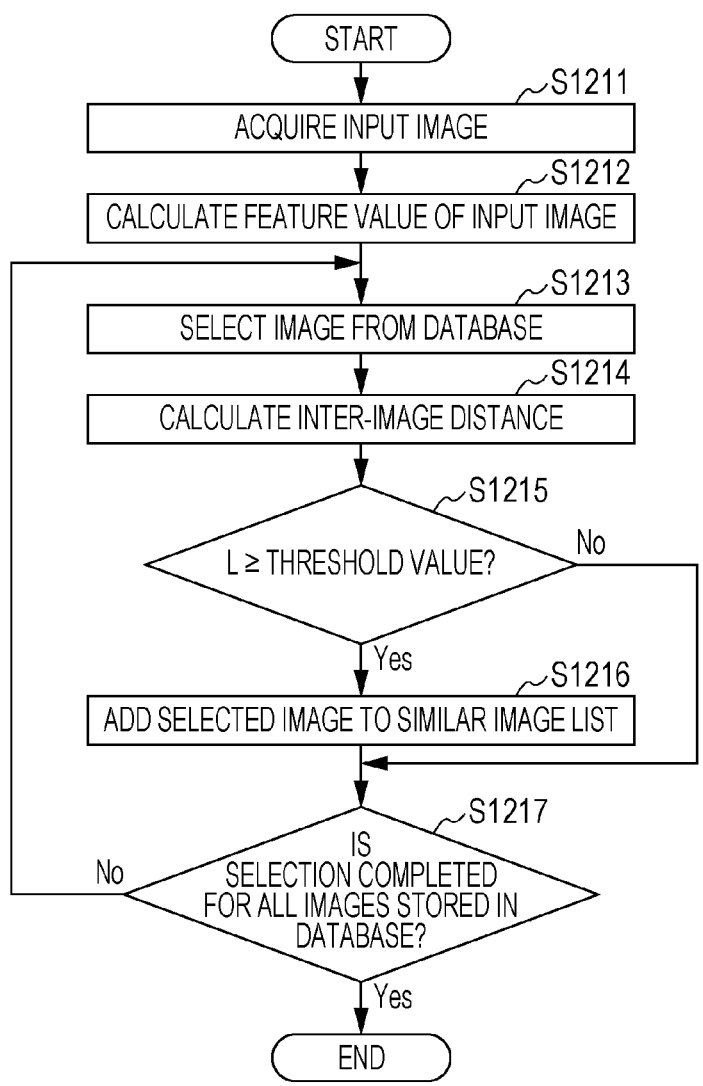
FIG. 10 is a flow chart illustrating an example of a detailed processing operation performed, in a step in FIG. 9, to search for a similar image.

FIG. 10 is a flow chart illustrating an example of a detailed processing operation of searching for similar images performed in step S1210 in FIG. 9.

Step S1211. The image search unit 103 of the program generation apparatus 100 acquires an input image from the terminal apparatus 200 via the acquisition unit 102.

Step S1212. The image search unit 103 calculates a feature value of the input image. More specifically, for example, the feature value is calculated by SIFT (Scale-Invariant Feature Transform), SURF (Speeded Up Robust Features), or the like, and a result is given in the form of a vector.

Step S1213. The image search unit 103 accesses the database DB via the interface unit 101, and selects an image as a selected image from the images stored in the database DB.

Step S1214. The image search unit 103 calculates an inter-image distance L representing a distance between a vector indicating the feature value of the input image and a vector indicating a feature value of the selected image. Note that the vector indicating the feature value of the selected image may be stored in advance in the database DB, or the vector of the feature value of the selected image may be calculated by the image search unit 103. The inter-image distance L may be, for example, a cosine distance. Note that the database DB may store feature values of the respective images stored in the database DB such that the feature values are associated with the respective images. When the image search unit 103 selects an image as the selected image from the images stored in the database DB, the image search unit 103 may acquire a feature value corresponding to the selected image from the database DB, that is, the image search unit 103 may acquire the feature value in association with the selected image.

Step S1215. The image search unit 103 determines whether the calculated inter-image distance L is greater than or equal to a predetermined threshold value. In a case where it is determined that the inter-image distance L is greater than or equal to the threshold value, (Yes in step S1215), the image search unit 103 proceeds to a process in step S1216. On the other hand, in a case where it is determined that the inter-image distance L is smaller than the threshold value (No in step S1215), the image search unit 103 proceeds to a process in step S1217.

Step S1216. In a case where it is determined in step S1215 that the inter-image distance L is greater than or equal to the threshold value, that is, in a case where it is determined that the selected image is similar to the input image, the image search unit 103 adds the selected image as a similar image to the list. More specifically, the image search unit 103 adds, to the list, the image ID of the similar image and the inter-image distance L calculated for the similar image. Hereinafter, this list will be referred to as a similar image list. Note that the image search unit 103 may store the similar image list.

Step S1217. The image search unit 103 determines whether the selection is completed for all images stored in the database DB. In a case where the image search unit 103 determines that the selection is not completed for all images (No in step S1217), the image search unit 103 returns the process to step S1213. On the other hand, in a case where the image search unit 103 determines that the selection is completed for all images (Yes in step S1217), the image search unit 103 ends the process of searching for similar images. When the search for similar images is completed, the above-described similar image list for the input image is completed.

Figure 11:
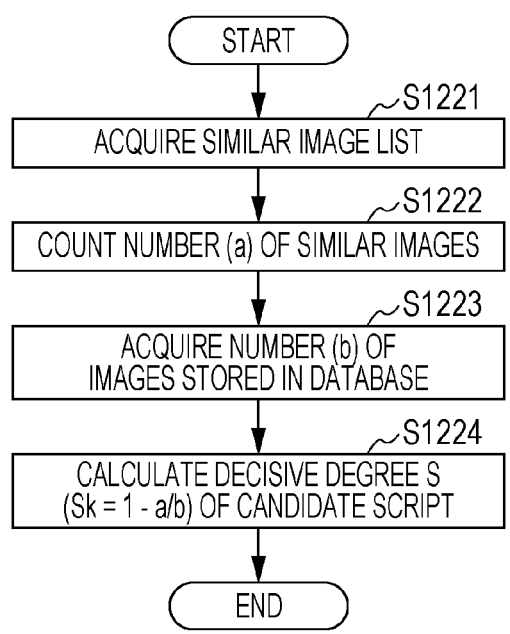
FIG. 11 is a flow chart illustrating an example of a detailed processing operation performed, in a step in FIG. 9, to calculate a decisive degree.

FIG. 11 is a flow chart illustrating an example of a detailed processing operation of calculating the decisive degree in step S1220 in FIG. 9.

Step S1221. The decisive degree calculation unit 105 of the program generation apparatus 100 acquires the similar image list from the image search unit 103.

Step S1222. The decisive degree calculation unit 105 counts the number of similar images included in the similar image list. Hereinafter, the counted number will be referred to, by way of example, as a.

Step S1223. The decisive degree calculation unit 105 acquires the number of images stored in the database DB. Hereinafter, the acquired number will be referred to, by way of example, as b. The decisive degree calculation unit 105 may acquire the number of images from the database DB or from a storage medium other than the database DB.

Step S1224. The decisive degree calculation unit 105 calculates the decisive degree Sk for the candidate script using the number a counted in step S1222 and the number b acquired in step S1223, for example, such that $Sk=1-a/b$. That is, the decisive degree Sk has a value within a range greater than 0 and smaller than 1. That is, in the present embodiment, the decisive degree calculation unit 105 determines the decisive degree Sk by calculating the ratio of the number of the one or more similar images obtained in the search to the number of images stored in the database DB and subtracting this ratio from 1 as described above. Alternatively, the decisive degree Sk may have a value inversely proportional to the number of similar images. For example, the decisive degree Sk may be given by $Sk=b/a$.

Figure 12:
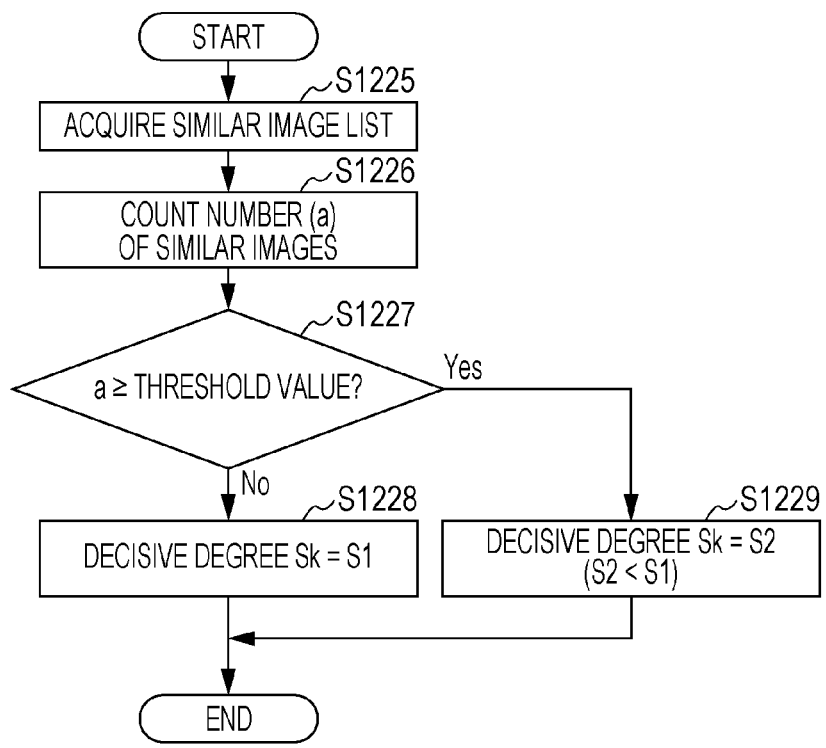
FIG. 12 is a flow chart illustrating another example of a detailed processing operation performed, in a step in FIG. 9, to calculate a decisive degree.

FIG. 12 is a flow chart illustrating another example of a detailed processing operation of calculating the decisive degree in step S1220 of FIG. 9.

Step S1225. The decisive degree calculation unit 105 of the program generation apparatus 100 acquires the similar image list from the image search unit 103.

Step S1226. The decisive degree calculation unit 105 counts the number of similar images included in the similar image list. The counted number is referred to, by way of example, as a.

Step S1227. The decisive degree calculation unit 105 determines whether the number a counted in step S1226 is greater than or equal to the threshold value. In a case where it is determined that the counted number a is smaller than the threshold value (No in step S1227), the decisive degree calculation unit 105 proceeds to a process in step S1228. On the other hand, in a case where it is determined that the counted number a is greater than or equal to the threshold value (Yes in step S1227), the decisive degree calculation unit 105 proceeds to a process in step S1229. The threshold value may be, for example, 0.1% of the number b of images stored in the database DB.

Step S1228. The number of similar images is small compared with the threshold value in this case, that is, the narrowing of similar images retrieved from the database DB is sufficient, and thus the decisive degree calculation unit 105 sets the decisive degree Sk of candidate scripts to a relatively high value S1.

Step S1229. The number of similar images is large compared with the threshold value in this case, that is, the narrowing of similar images retrieved from the database DB is not sufficient, and thus the decisive degree calculation unit 105 sets the decisive degree Sk of candidate scripts to a relatively low value S2 (<S1).

In the present embodiment, as described above, in a case where the number of one or more similar images retrieved is greater than or equal to the threshold value, the decisive degree calculation unit 105 may set the decisive degree Sk to the value S2. On the other hand, in a case where the number of one or more similar images retrieved is smaller than the threshold value, the decisive degree calculation unit 105 may set the decisive degree Sk to the value S1 greater than S2.

Figure 13:
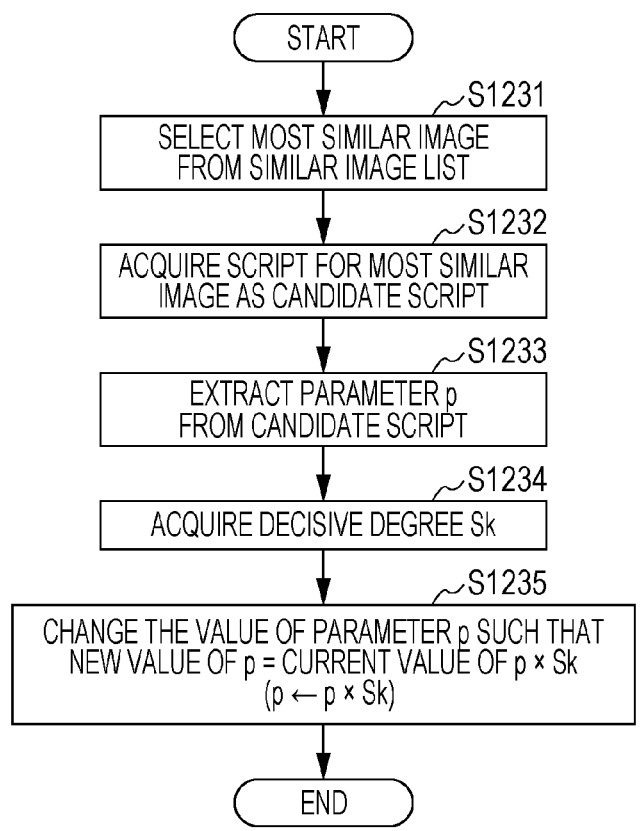
FIG. 13 is a flow chart illustrating an example of a detailed processing operation performed, in a step in FIG. 9, to generate a parameter.

FIG. 13 is a flow chart illustrating an example of a detailed processing operation of generating a parameter in step S1230 of FIG. 9.

Step S1231. The script selection unit 104 acquires the similar image list from the image search unit 103, and the script selection unit 104 selects, as a highest-similarity image, one image most similar to the input image from the one or more similar images included in the acquired similar image list. More specifically, the script selection unit 104 selects an image ID associated with a greatest inter-image distance L from the image ID's of the one or more similar images included in the similar image list, and employs the selected image ID as the image ID of the highest-similarity image.

Step S1232. The script selection unit 104 selects, as a candidate script, a script associated with the highest-similarity image (more specifically, the image ID of the highest-similarity image) from the scripts stored in the database DB. The script selection unit 104 outputs the selected candidate script to the parameter change unit 106.

Step S1233. The parameter change unit 106 acquires the candidate script from the script selection unit 104 and extracts a parameter p included in the candidate script.

Step S1234. The parameter change unit 106 further acquires the decisive degree Sk calculated by the decisive degree calculation unit 105.

Step S1235. The parameter change unit 106 changes the value of the parameter p extracted in step S1233 depending on the decisive degree Sk acquired in step S1234. More specifically, for example, when the value of the parameter p is denoted by z, the parameter change unit 106 changes the value z of the parameter p to a new value given by z×Sk.

Note that in step S1240 shown in FIG. 9, the value of the parameter p of the candidate script is multiplied by Sk by the parameter change unit 106. As a result, a presentation script including the parameter p having the multiplied value is generated.

Figure 14:
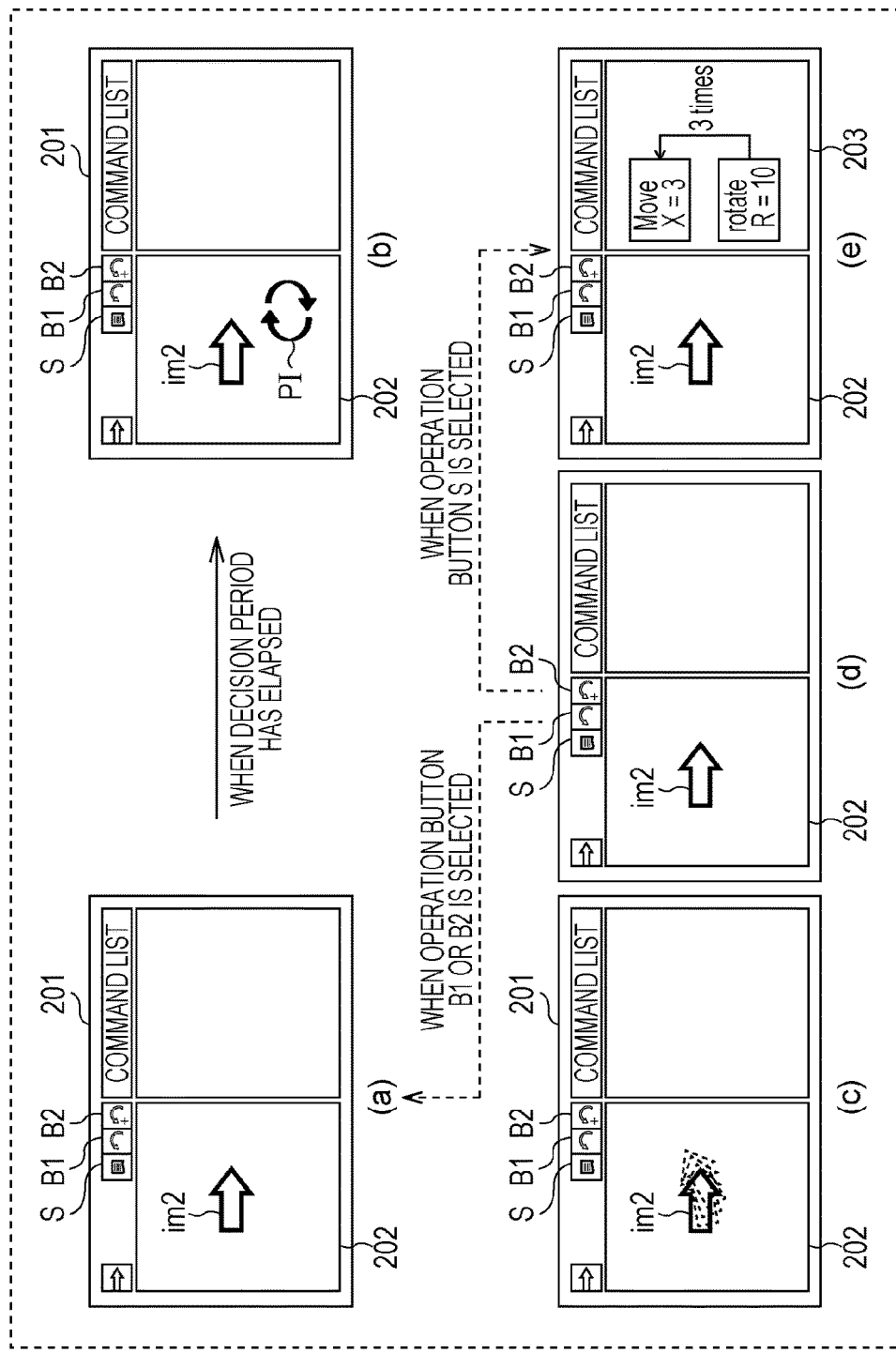
FIG. 14 is a diagram illustrating an example of a manner in which an image displayed on a screen of a terminal apparatus is changed by a program generation apparatus according to an embodiment.

FIG. 14 illustrates an example of a manner in which an image displayed on a screen of the terminal apparatus 200 is changed by the program generation apparatus 100 according to an embodiment.

For example, a user draws an input image im2 by performing an input operation as is shown in FIG. 14(a). The drawn input image im2 is displayed in the image input area 202 of the script generation screen 201.

When the decision period described above passes since the input image im2 is drawn, the program generation apparatus 100 starts generating a presentation script as is shown in FIG. 14(b). In this process, the program generation apparatus 100 displays a progress indicator PI in the image input area 202 to indicate that the generation of the presentation script is in progress.

When the generation of the presentation script is completed, the program generation apparatus 100 executes this presentation script thereby changing the input image im2 displayed in the image input area 202 as is shown in FIG. 14(c).

Next, for example, a user selects the operation button B1 of the script generation screen 201 by performing an input operation as is shown in FIG. 14(d). In response, the terminal apparatus 200 instructs the program generation apparatus 100 to amend or edit the input image im2. When the program generation apparatus 100 accepts this instruction, the program generation apparatus 100 returns to the state in which the script generation screen 201 shown in FIG. 14(a) is displayed on the display 200d of the terminal apparatus 200 and accepts amending or editing the input image im2.

In another example, a user may select the operation button B2 of the script generation screen 201 by performing an input operation as is shown in FIG. 14(d). In response, the terminal apparatus 200 instructs the program generation apparatus 100 to add a new input image. When the program generation apparatus 100 accepts this instruction, the program generation apparatus 100 returns to the state in which the script generation screen 201 shown in FIG. 14(a) is displayed on the display 200d of the terminal apparatus 200 and accepts a new input image.

In another example, as is shown in FIG. 14(d), a user may select the operation button S of the script generation screen 201 by performing an input operation. In response, the terminal apparatus 200 instructs the program generation apparatus 100 to display the presentation script. When the program generation apparatus 100 accepts this instruction, displays the generated presentation script in the script display/edit area 203 of the script generation screen 201 as is shown in FIG. 14(e).

In the example shown in FIG. 14, when a waiting period has elapsed since a last input image was acquired, the program generation apparatus 100 automatically starts generating the presentation script. Alternatively, the program generation apparatus 100 may start generating the presentation script in response to an instruction explicitly given by a user.

Figure 15:
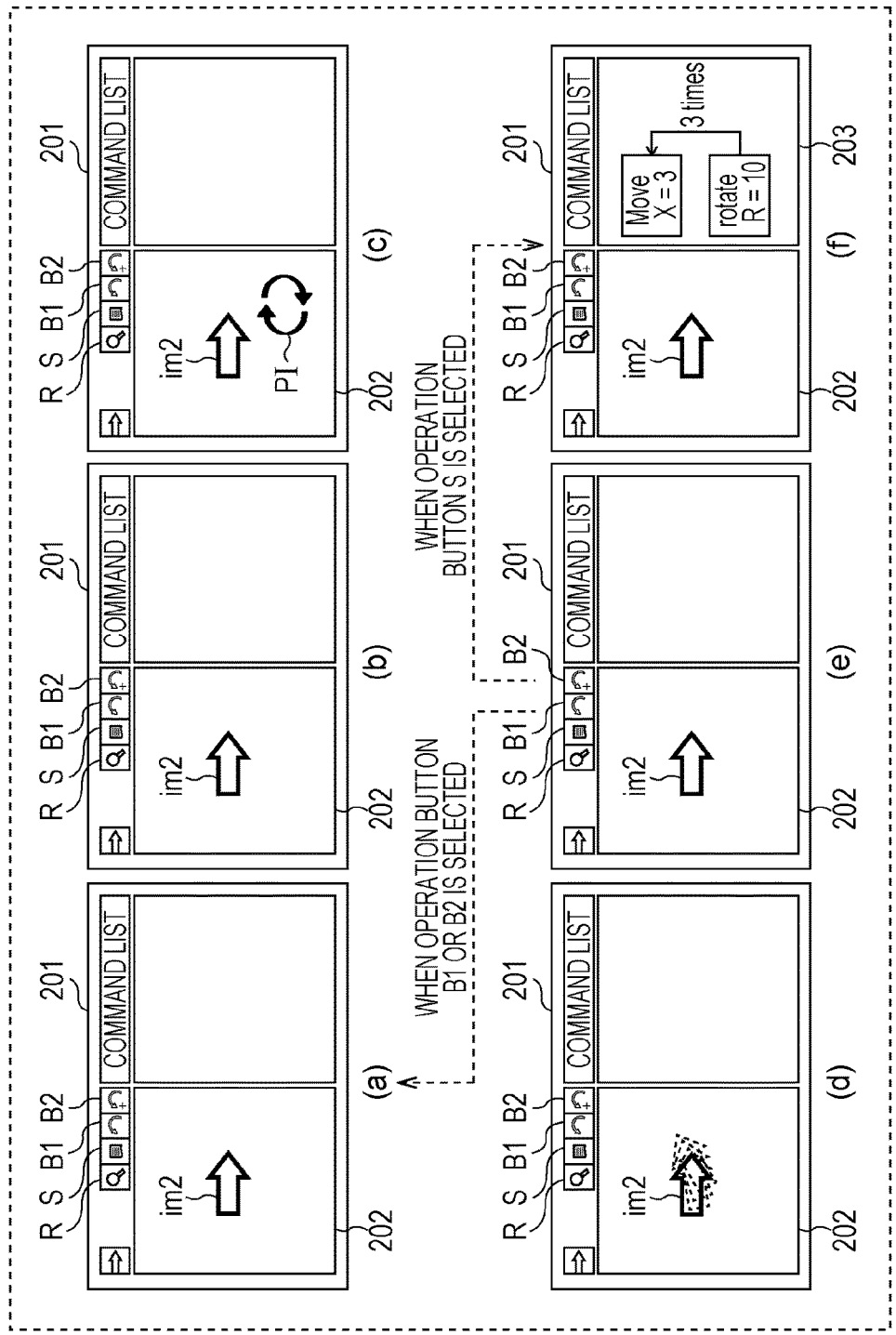
FIG. 15 is a diagram illustrating another example of a manner in which an image displayed on a screen of a terminal apparatus is changed by a program generation apparatus according to an embodiment.

FIG. 15 illustrates another example of a manner in which an image displayed on a screen of the terminal apparatus 200 is changed by the program generation apparatus 100 according to an embodiment.

The program generation apparatus 100 displays an operation button R on the script generation screen 201 as is shown in FIG. 15(a) to FIG. 15(f). This operation button R is used to instruct the program generation apparatus 100 to start generating a script.

A user draws an input image im2 by performing an input operation as is shown in FIG. 15(a). The drawn input image im2 is displayed in the image input area 202 of the script generation screen 201.

When a user wants to generate a script for the input image im2, the user selects the operation button R by performing an input operation as is shown in FIG. 15(b). In response, for example, the color of the operation button R may change. When the operation button R is selected, the terminal apparatus 200 instructs the program generation apparatus 100 to start generating a presentation script.

In response, the program generation apparatus 100 starts generating the presentation script as is shown in FIG. 15(c). As in the example shown in FIG. 14, the program generation apparatus 100 displays a progress indicator PI in the image input area 202 to indicate that the generation of the presentation script is in progress.

When the generation of the presentation script is completed, the program generation apparatus 100 executes this presentation script thereby changing the input image im2 displayed in the image input area 202 as is shown in FIG. 15(d).

Thereafter, similarly in FIG. 14(d) and FIG. 14(e), the program generation apparatus 100 changes the displaying of the script generation screen 201 as is shown in FIG. 15(e) and FIG. 15(f).

As described above, the program generation apparatus 100 according to the present embodiment is capable of easily generating a script for changing an input image. Furthermore, the program generation apparatus 100 is capable of providing information to a user such that the user can easily recognize the state of narrowing scripts from the degree to which the input image is changed by the generated script.

Modifications

In the embodiments described above, when a presentation script is generated, the program generation apparatus 100 executes the presentation script once. Alternatively, in a modification described below, the presentation script is executed not only once but repeatedly. Furthermore, in the present modification, a project is used in narrowing similar images.

FIGS. 16A and 16B are diagrams each illustrating an example of an input image that changes in accordance with a presentation script generated by a program generation apparatus 100 according to a modification.

In the present modification, the display control unit 107 of the program generation apparatus 100 repeatedly executes the presentation script generated by the parameter change unit 106. That is, the display control unit 107 returns the input image changed by the presentation program to the original state, and executes the presentation script again thereby repeatedly changing the input image displayed on the display 200d.

For example, in a case where an input image im6 representing a ball is drawn in the image input area 202 as is shown in FIG. 16A, the script selection unit 104 selects a candidate script that causes the input image im6 to move. The parameter change unit 106 generates a presentation script by changing a value of a parameter representing a movement distance included in the candidate script according to a result of the searching described above. The display control unit 107 moves the input image im6 displayed in the image input area 202 by executing the generated presentation script. In the present modification, the display control unit 107 returns the input image im6 moved by the presentation program to the original position, and executes the presentation script again. As a result, the input image im6 displayed in the image input area 202 is changed repeatedly.

By repeatedly moving the input image im6 in the above-described manner, it becomes possible for a user to easily notice that a presentation program has been generated and executed even in a case where the input image im6 is moved within a small movement range or a small operation range. That is, the user can intuitively and easily understand the state of searching of scripts.

In a case where the input image im6 moves within a small operation range, a user determines that the narrowing of scripts is not sufficient. In this case, the user may draw a new input image in the image input area 202.

For example, as is shown in FIG. 16B, a new input image im7 representing a racket may be drawn at a location close to the input image im6 representing the ball. In this case, the image search unit 103 of the program generation apparatus 100 searches for similar images also for the input image im7. Furthermore, the image search unit 103 searches for a project including a similar image of the input image im6 and a similar image of the input image im7 from the database DB. This results in further narrowing of the similar images for the input image im6 representing the ball. As a result, a reduction occurs in the value of the decisive degree Sk calculated by the decisive degree calculation unit 105. Therefore, the parameter indicating the movement distance included in the candidate script is not changed to a value smaller than in FIG. 16A. Therefore, the parameter change unit 106 generates a presentation script including a parameter indicating a large movement distance. The display control unit 107 greatly moves the input image im6 displayed in the image input area 202 by executing the generated presentation script. That is, the operation range of the input image im6 is increased.

Thus, as the number of input images drawn in the image input area 202 increase, that is, as the number of input images included in a project increases, scripts are further narrowed, which makes it possible to easily generate a script more suitable for the input image.

Other Modifications

1. Calculating Decisive Degree Using Variance

In the embodiments described above, the decisive degree of candidate scripts is calculated using the number of retrieved similar images. Alternatively, the decisive degree may be calculated using the variance of inter-image distances L of the respective retrieved similar images. For example, the decisive degree calculation unit 105 determines the decisive degree such that the decisive degree decreases as the variance increases and the decisive degree increases as the variance decreases. More specifically, the decisive degree calculation unit 105 determines the decisive degree such that the decisive degree has a value inversely proportional to the variance or such that when the variance is smaller than a threshold value, the decisive degree is set to a large value, while when the variance is greater than or equal to the threshold value, the decisive degree is set to a small value.

2. Adjusting Time in which Input Image Changes

In the embodiments described above, the presentation script is generated by changing one or more values of corresponding one or more parameters included in the candidate script. However, the method of generating the presentation script is not limited to that disclosed in the embodiments. For example, the display control unit 107 may display a candidate script as a presentation script without changing parameters included in the candidate script. In this case, the display control unit 107 calculates a change presentation time based on the decisive degree and a predetermined time in which an input image is changed by the candidate script, and the display control unit 107 changes the input image in the calculated change presentation time. Note that the predetermined time is a predetermined time different from a parameter included in the candidate script. When the decisive degree is small, the display control unit 107 determines the change presentation time so as to be smaller than the predetermined time, and the display control unit 107 executes the candidate script such that the input image changes within the change presentation time. As a result, the input image changes in a manner similar to a fast-forward playback. Conversely, when the decisive degree is large, the display control unit 107 determines the change presentation time so as to be longer than the predetermined time, and the display control unit 107 executes the candidate script such that the input image changes within the change presentation time. As a result, the input image changes more slowly than in the case where the decisive degree is small.

By changing the change presentation time depending on the decisive degree in the above-described manner, it becomes possible for a user to intuitively and easily recognize the state of narrowing scripts.

3. Changing Image in Predetermined Mode

In a case where the decisive degree is small, the display control unit 107 may change the input image displayed in the image input area 202 in a predetermined mode. For example, the display control unit 107 may vibrate the input image. By vibrating the input image, it is possible to inform a user that a script for the input image is not yet determined. In this case, the script selection unit 104 does not need to select a candidate script.

4. Selecting Candidate Scripts

In the embodiments described above, a script associated with a similar image most similar to the input image is selected as the candidate script. Alternatively, two or more candidate scripts may be selected. For example, the script selection unit 104 selects N similar images (N is an integer greater than or equal to 2) in a descending order from the greatest inter-image distance L to the smallest inter-image distance L from similar images included in the similar image list. The script selection unit 104 then retrieves, from the database DB, scripts associated with the respective N selected similar images thereby selecting N scripts.

Thereafter, the script selection unit 104 calculates the total sum of the selected N scripts and employs the result as the candidate script thereby generating the candidate script. Alternatively, the script selection unit 104 may generate an array in which the selected N scripts are arranged in a particular order in which the scripts are executed, and employ the array as a candidate script. The particular order may be a descending or ascending order of inter-image distances L of images associated with the respective N scripts.

In the example described above, the script selection unit 104 selects scripts associated with the respective N similar images. However, duplication among scripts may be deleted. That is, in a case where the N scripts include scripts belonging to the same type, the script selection unit 104 may not select all scripts belonging to this type but may select one script from these scripts.

That is, the program generation method according to the present modification is a program generation method to generate a computer program for changing an image being displayed. This program generation method includes (a) acquiring, as an input image, an image drawn on a display, (b) accessing a storage medium storing images and computer programs associated with the respective images, each of the computer programs being for use in changing a corresponding one of the images, (c) searching for one or more images, as similar images, similar to the input image from the images stored in the storage medium, (d) generating a computer program, as a candidate program, for changing the input image, the generating being based on computer programs associated with the one or more respective similar images retrieved from the storage medium, (e) calculating a decisive degree of the candidate program for the input image, based on a result of the search for the one or more similar images, and (f) changing the input image displayed on the display according to the calculated decisive degree. Note that the computer program and the candidate program each may be, for example, a script.

That is, in (d) described above, the candidate program may be generated by selecting one of the computer programs associated with the one or more respective similar images retrieved. In (e) described above, the decisive degree for the input image may is calculated using the variance of the inter-image distances L of the one or more respective similar images retrieved. In (f) described above, the input image may be changed according to the decisive degree regardless of parameters included in the generated candidate program. More specifically, in (f), for example, in a case where the decisive degree is smaller than a threshold value, the input image may be changed in a predetermined mode. More specifically, the predetermined mode may be a mode in which the input image is vibrated. Conversely, in a case where the decisive degree is greater than or equal to the threshold value, the input image may be changed according to the candidate program.

According to the modification described above, it is possible to achieve advantageous effects similar to those achieved in the embodiments described above.

Summary of Embodiments and Modifications

Figure 17:
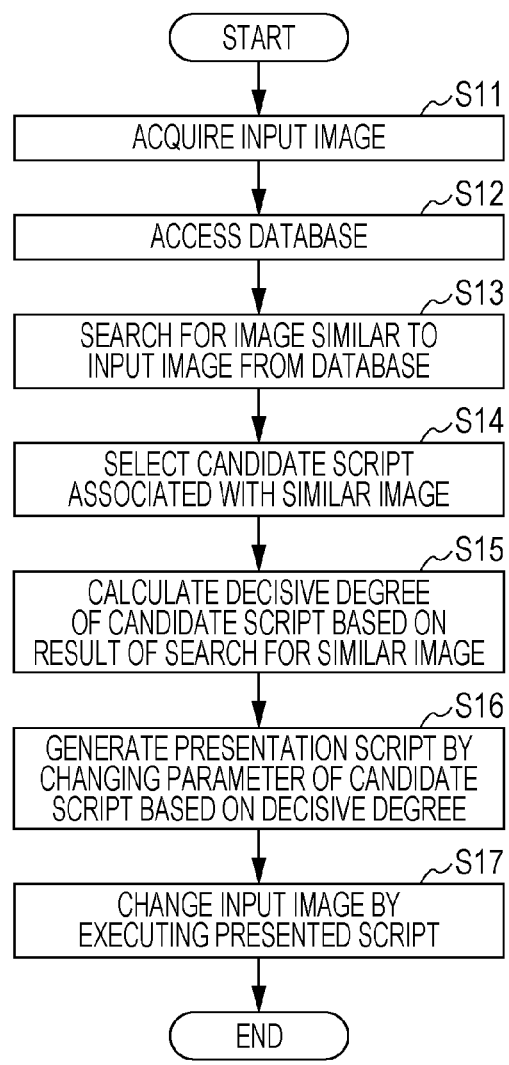
FIG. 17 is a flow chart illustrating an example of a program generation method according to an embodiment of the disclosure.

FIG. 17 is a flow chart illustrating an example of a program generation method according to an embodiment of the disclosure.

In an aspect of the present disclosure, a program generation method, for generating a computer program as a script for changing an image being displayed, includes a process from step S11 to step S17. A user selects an image and displays it on the display 200*d* and/or the user draws an image by using an input device (such as a mouse) and displays it on the display 200*d*. In step S11, the image drawn on the display 200*d* is acquired as an input image. In step S12, the process accesses the database DB storing images and scripts for changing the respective image, the scripts being associated with the respective images. In step S13, one or more images are retrieved as similar images from the images stored in the database DB. In step S14, a script is selected as a candidate script from scripts associated with the one or more respective similar images retrieved from the database DB. In step S15, the decisive degree of the candidate script for the input image is calculated based on the result of the search for the one or more similar images. In step S16, a presentation program is generated by changing a value of a parameter, which is included in the candidate script and which indicates the degree to which an image is changed, depending on the decisive degree. In step S17, the input image displayed on the display 200d is changed by executing the generated presentation program.

As a result, one or more image similar to the input image are retrieved as similar images, and one of the scripts associated with the one or more respective images is selected as a candidate script. A value of a parameter of the candidate script is changed thereby generating a presentation program to be applied to the input image. That is, a presentation script to be applied to the input image is automatically generated. Thus, a user who draws the input image on the display 200d does not need to generate a script to be applied to the input image by combining some of commands prepared in advance. This makes it possible to easily generate a script for changing the input image.

In a program generation method according to an aspect of the present disclosure, the value of the parameter of the candidate script is changed depending on the decisive degree calculated based on a result of the search for the one or more similar images. In the database DB, scripts are stored in association with the respective images, and thus searching for a similar image is equivalently searching for a script suitable for the input image. The parameter indicates a degree to which an image is changed. Therefore, when a presentation script including a parameter having a changed value is executed, the input image being displayed is changed to a degree corresponding to the changed parameter, which allows the user to intuitively and easily understand the state of searching of computer programs. That is, it is possible to provide information to a user such that the user can easily understand whether the search for scripts suitable for the input image from a large number of scripts stored in the database DB has been narrowed down sufficiently or not. In a case where the user realizes that the narrow is not sufficient enough, the user may, for example, add a graphical image or the like to the input image or may make some other amendment. This time, it is possible to further narrow the scripts, which makes it possible to generate a script, as a presentation script, more suitable for the input image. That is, it is possible to easily generate a script suitable for the input image.

The program generation apparatus and the program generation method have been described above with reference to one or more embodiments and modifications. However, the present disclosure is not limited to the embodiments or the modifications described above. It will be apparent to those skilled in the art that many various modifications may be applicable to the embodiments without departing from the spirit and scope of the present disclosure. Furthermore, constituent elements of different embodiments may be combined. In this case, any resultant combination also falls within the scope of the present disclosure.

For example, in the embodiments described above, the program generation apparatus 100 performs displaying and changing of an input image on the display 200d of the terminal apparatus 200 via the communication network 300. Alternatively, the terminal apparatus 200 may change the input image without communicating with the program generation apparatus 100. That is, the terminal apparatus 200 may generate a script and execute the script thereby changing the input image. In this case, for example, the terminal apparatus 200 downloads a control program for realizing a function of the program generation apparatus 100, for example, from the program generation apparatus 100. By executing this control program, the terminal apparatus 200 generates a script and changes the input image in a similar manner to the embodiments or modifications described above.

In each of the embodiments and modifications described above, each constituent element may be realized using dedicated hardware or may be realized by executing a software program corresponding to the constituent element. Each constituent element may be realized by a program execution unit such as a CPU, a process or the like by reading software program stored in a storage medium such as a hard disk, a semiconductor memory, or the like and executing the software program. The software program, which realizes the program generation apparatus and the like according to the embodiment described above, controls a computer to execute steps included in flow charts shown in FIGS. 8 to 13 and FIG. 17.

In the present disclosure, all or part of units and devices, and all or part of functional blocks illustrated in FIG. 4 may be implemented by one or more electronic circuits including a semiconductor device, a semiconductor integrated circuit (IC), an LSI (Large Scale Integration). The LSI or the IC may be integrated on a single chip or may be realized by a combination of chips. For example, functional blocks other than storage elements may be integrated on a single chip. The integrated circuits called the LSI or the IC herein may be called differently depending on the integration density, and integrated circuits called a system LSI, a VLSI (Very Large Scale Integration), or a ULSI (Ultra Large Scale Integration) may also be used in the present disclosure. Furthermore, a field programmable gate array (FPGA) capable of being programmed after the LIS is produced, and a reconfigurable logic device capable of being reconfigured in terms of internal connections or capable of being set up in terms of internal circuits segments may also be used for the same purpose.

Part or all of functions or operations of units, apparatuses, elements of the apparatuses may be realized by performing a software process. In this case, software may be stored in a non-transitory storage medium. The non-transitory storage medium may be one of or a combination of a ROM, an optical disk, a hard disk drive, or the like. When the software is executed by a processor, a particular function in the software may be implemented by a cooperation of the processor and a peripheral device. The system or the apparatus may include one or more non-transitory storage media in which software is stored, processors, and hardware devices such as an interface.

The present disclosure provides an advantageous effect that makes it possible to easily generate a computer program for changing an image, and the present disclosure is applicable, for example, to a programming learning system or the like.

What is claimed is:
1. A program generation method, comprising:
(a) acquiring an input image displayed on a display;

(b) accessing a storage medium storing images and computer programs, the images each corresponding to the computer programs, each of the computer programs being for use in changing the corresponding image;
(c) searching for one or more images, as one or more similar images, similar to the input image from the images stored in the storage medium;
(d) selecting a computer program as a candidate program from one or more computer programs corresponding the one or more similar images, the candidate program corresponding to a similar image included in the one or more similar images;
(e) calculating a decisive degree on the candidate program for the input image, based on a result of the search for the one or more similar images;
(f) generating a presentation program by changing a value of all or part of one or more parameters included in the candidate program in accordance with the decisive degree, the value of the one or more parameters indicating a degree to which the similar image is to be changed; and
(g) changing the input image displayed on the display by executing the generated presentation program.

2. The program generation method according to claim 1, wherein in (d), the computer program selected as the candidate program is a computer program corresponding to an image most similar to the input image among the one or more similar images.

3. The program generation method according to claim 1, wherein the decisive degree is such a value that the greater the number of the one or more similar images is, the smaller the value is, while the smaller the number of the one or more similar images is, the greater the value is.

4. The program generation method according to claim 3, wherein in (e), the decisive degree is calculated by calculating the ratio of the number of the one or more similar images to the number of the images stored in the storage medium and subtracting the resultant ratio from 1.

5. The program generation method according to claim 3, wherein in (e), the decisive degree is a first value when the number of the one or more similar images is greater than or equal to a threshold value, and the decisive degree is a second value greater than the first value when the number of the one or more similar images is smaller than the threshold value.

6. The program generation method according to claim 1, wherein the one or more parameters includes a movement distance of the similar image, an amount of change in a size of the similar image, or an amount of change in a color component of the similar image.

7. The program generation method according to claim 1, wherein in (g), furthermore, the input image changed by the presentation program is returned to its original state, and the presentation program is executed again thereby repeatedly changing the input image displayed on the display.

8. The program generation method according to claim 1, further comprising (h) displaying the generated presentation program on the display.

9. A program generation method, comprising:
(a) acquiring an input image displayed on a display;
(b) accessing a storage medium storing images and computer programs, the images each corresponding to the computer programs, each of the computer programs being for use in changing the corresponding image;
(c) searching for one or more images, as one or more similar images, similar to the input image from the images stored in the storage medium;
(d) generating a computer program, as a candidate program for changing the input image, based on computer programs,
(e) calculating a decisive degree on the candidate program for the input image, based on a result of the search for the one or more similar images; and
(f) changing the input image on the display according to the calculated decisive degree.

10. A program generation apparatus comprising:
an interface to access a storage medium storing images and computer programs, the images each corresponding to the computer programs, each of the computer programs being for use in changing the corresponding image;
a processing circuit adapted to perform a process including:
(a) acquiring an input image displayed on a display;
(b) accessing the storage medium via the interface;
(c) searching for one or more images, as one or more similar images, similar to the input image from the images stored in the storage medium;
(d) selecting a computer program as a candidate program from one or more computer programs corresponding the one or more similar images, the candidate program corresponding to a similar image included in the one or more similar images;
(e) calculating a decisive degree on the candidate program for the input image, based on a result of the search for the one or more similar images;
(f) generating a presentation program by changing a value of all or part of one or more parameters included in the candidate program in accordance with the decisive degree, the value of the one or more parameters indicating a degree to which the similar image is to be changed; and
(g) changing the displayed input image by executing the generated presentation program.

11. A storage medium including a control program stored therein for causing a device including a processor to execute a process, the storage medium being non-transitory and computer-readable, the process comprising:
(a) acquiring an input image displayed on a display;
(b) accessing a storage medium storing images and computer programs, the images each corresponding to the computer programs, each of the computer programs being for use in changing the corresponding image;
(c) searching for one or more images, as one or more similar images, similar to the input image from the images stored in the storage medium;
(d) selecting a computer program as a candidate program from one or more computer programs corresponding the one or more similar images, the candidate program corresponding to a similar image included in the one or more similar images;
(e) calculating a decisive degree on the candidate program for the input image, based on a result of the search for the one or more similar images;
(f) generating a presentation program by changing a value of all or part of one or more parameters included in the candidate program in accordance with the decisive degree, the value of the one or more parameters indicating a degree to which the similar image is to be changed; and
(g) changing the input image displayed on the display by executing the generated presentation program.

* * * * *